United States Patent
Shimomura et al.

(10) Patent No.: US 6,692,155 B2
(45) Date of Patent: Feb. 17, 2004

(54) ROLLING SLIDING MEMBER, PROCESS FOR THE PRODUCTION THEREOF AND ROLLING SLIDING UNIT

(75) Inventors: Yuji Shimomura, Kanagawa (JP); Tomoyuki Aizawa, Kanagawa (JP); Dai Kinno, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/809,247

(22) Filed: Mar. 16, 2001

(65) Prior Publication Data

US 2001/0033706 A1 Oct. 25, 2001

(30) Foreign Application Priority Data

| Mar. 16, 2000 | (JP) | ................................. P. 2000-073653 |
| Sep. 6, 2000 | (JP) | ................................. P. 2000-270071 |
| Oct. 2, 2000 | (JP) | ................................. P. 2000-301656 |
| Feb. 21, 2001 | (JP) | ................................. P. 2001-044839 |

(51) Int. Cl.[7] ................................................ F16C 19/00
(52) U.S. Cl. ........................ 384/464; 384/492; 384/625; 384/907
(58) Field of Search .................................. 384/569, 463, 384/492, 625, 548, 456, 464, 513, 907, 912, 913, 902; 123/90.51; 428/612; 148/219

(56) References Cited

U.S. PATENT DOCUMENTS

| 2,724,219 A | 11/1955 | Reaser ........................... 51/91 |
| 3,675,978 A | 7/1972 | McKelvey .................... 308/214 |
| 3,782,795 A | 1/1974 | Richey et al. ............... 308/214 |
| 5,019,182 A | * 5/1991 | Arimi ........................... 148/219 |
| 5,150,974 A | * 9/1992 | Tamada et al. .............. 384/463 |
| 5,630,668 A | * 5/1997 | Ikezawa et al. .............. 384/913 |
| 5,647,313 A | * 7/1997 | Izumida et al. ........... 123/90.51 |
| 5,669,719 A | 9/1997 | Kinno et al. .................. 384/463 |
| 5,670,265 A | * 9/1997 | Grell et al. ................... 428/612 |
| 5,816,207 A | 10/1998 | Kadokawa et al. ....... 123/90.42 |
| RE36,405 E | * 11/1999 | Akita et al. .................. 384/902 |
| 6,095,013 A | 8/2000 | Hashimoto et al. ........... 74/569 |
| 6,228,813 B1 | * 5/2001 | Yabe et al. .................. 384/463 |

FOREIGN PATENT DOCUMENTS

| DE | 37 16582 C1 | 4/1988 | |
| DE | 41 25 585 A1 | 4/1992 | |
| DE | 690 09 869 T4 | 8/1995 | |
| DE | 41 42 313 C2 | 10/1998 | |
| DE | 197 28 919 A1 | 1/1999 | |
| GB | 2120737 | 12/1983 | ........... F16C/33/66 |
| JP | 36-105 | 1/1936 | |
| JP | 52-17149 | 2/1977 | ........... F16C/33/30 |
| JP | 64-58814 | 3/1989 | ........... F16C/33/62 |
| JP | 2-221714 | 9/1990 | ........... F16C/33/10 |
| JP | 6-159371 | 6/1994 | ........... F16C/33/62 |
| JP | 8-166021 | 6/1996 | ........... F16C/33/66 |
| JP | 9-177774 | 7/1997 | ........... F16C/19/50 |
| JP | 11-290918 | 10/1999 | ........... B21B/31/07 |
| JP | 1-295022 | 11/1999 | ........... F16C/33/62 |

* cited by examiner

Primary Examiner—Christopher P. Schwartz
Assistant Examiner—Melanie Torres
(74) Attorney, Agent, or Firm—Sughrue Mion, PLLC

(57) ABSTRACT

A formed film is formed on the surface of a metal substrate made of an iron-based metal. Thereafter, the surface of the formed film is subjected to treatment for lessening surface roughness such as rolling. In this arrangement, a member which exhibits a sufficient seizing resistance even after being freed of formed film can be obtained.

4 Claims, 7 Drawing Sheets

ROLLING SLIDING MEMBER, PROCESS FOR THE PRODUCTION THEREOF AND ROLLING SLIDING UNIT

BACKGROUND OF THE INVENTION

The present invention relates to improvements in surface conditions of a rolling sliding member which comes in rolling or sliding contact with its mating face during use such as bearing ring, rolling element and retainer constituting a rolling bearing or cam follower. More particularly, the present invention can exert a great effect particularly when used in an application which is subject to great load and hence smearing or seizing such as roll neck bearing for steel rolling mill and bearing for railway vehicle.

For the purpose of preventing rust or improving lubricating properties in the initial stage of operation, it is commonly practiced to provide a formed film of manganese phosphate on the surface of various mechanical parts made of an iron-based metal which makes displacement relative to the surface of its mating member during use, e.g., sliding surface thereof. However, formation not only causes the rise in surface roughness but also worsens the dimensional accuracy by the thickness of the formed film. The rise in surface roughness and the deterioration of dimensional accuracy cause not only the rise in torque or calorific value in the initial stage of operation but also the deterioration of rotary properties. Therefore, it is commonly practiced to control the kind, concentration and other factors of the forming solution to be used so that the formed film can be reduced in thickness and formed by dense grains.

The process for the production of a chemically formed film of manganese phosphate will be generally described hereinafter. In some detail, when a rolling sliding member made of an iron-based metal is dipped in an aqueous solution of manganese phosphate, the aqueous solution of manganese phosphate undergoes primary dissociation to produce free phosphoric acid that dissolves iron on the surface of the substrate metal of the rolling sliding member to decrease the hydrogen ion concentration on the metal surface. While the equilibrium of dissociation of the foregoing aqueous solution of manganese phosphate moves over the surface of the substrate metal constituting the foregoing rolling sliding member, an insoluble manganese phosphate crystal is deposited on the surface of the substrate metal.

The manganese phosphate crystal thus deposited on the surface of the substrate metal is manganese and iron. The particle diameter of the crystal and the thickness and roughness of the deposit are affected by the components of the compound. Accordingly, the particle diameter of the manganese phosphate crystal deposited on the surface of the substrate metal increases to increase the surface roughness of the deposit depending on the composition of the foregoing aqueous solution of manganese phosphate which is a forming solution. When the surface roughness of the deposit thus increases, the substantial contact area of the surface of the rolling sliding member with the surface of its mating member decreases. In addition, protrusion interference between crystal particles causes early peeling of the formed film during operation.

The surface of the substrate metal which has been exposed after the peeling of the formed film has a raised surface roughness because iron has been dissolved during the process of production of the formed film. Therefore, after the peeling of the formed film, minute protrusions present on the rough surface of the exposed iron-based metal undergo interference with each other (collision of protrusions present on the surface of a pair of members which make displacement relative to each other), causing early damage such as smearing on the metal surface that can result in serious damages such as seizing in some extreme cases.

Under these circumstances, JP-A-6-159371 (The term "JP-A" as used herein means an "unexamined published Japanese patent application") discloses a technique which comprises controlling the composition and concentration of the forming solution to make the surface roughness of a formed substrate metal as large as twice or less that of an unformed substrate metal. In accordance with this technique, even after the formed film has been peeled to cause the substrate metal to be exposed, an oil film can be formed between the metal surfaces to prevent the occurrence of serious damages such as early peeling and seizing on the metal surface.

The inner ring, outer ring and rolling elements constituting a rolling bearing are rolling sliding members for which the present invention is intended. The provision of a formed film such as manganese phosphate film on the surface of the inner ring, outer ring and rolling elements has heretofore been practiced for rolling bearing for roll neck as shown in FIGS. 9 and 10. A roll for rolling a metal comprises a column portion called roll neck provided in the central part of the both axial end faces. The column portion is supported by a rolling bearing as shown in FIGS. 9 and 10 in such an arrangement that it can be freely rotated with respect to a fixed supporting device. The rotary bearing device for roll neck shown in FIGS. 9 and 10 will be firstly described. The roll neck 2 provided in the central part of the both axial end faces of the roll 1 is rotably supported inside the housing 3 by a double-row tapered roller bearing unit 4. The double-row tapered roller bearing unit 4 comprises a plurality of tapered rollers 9, 9 provided between inner ring races 6, 6 provided on the outer surface of innre rings 5, 5 externally fitted onto the roll neck 2 and outer ring races 8, 8 provided on the inner surface of outer rings 7a, 7b internally fitted into the housing 3.

The roll 1 which is rotably supported by the foregoing bearing device is rotated at a rate of from 1,000 to 1,800 $min^{-1}$ (r.p.m.) during the operation of the rolling apparatus. Accordingly, it is necessary that the bearing device comprise a grease enclosed therein so that it can be lubricated during the operation of the rolling apparatus. At the same time, it is necessary that the metal material to be rolled be sprayed with cooling water to prevent the temperature rise accompanied by rolling. Therefore, the bearing device is provided with a sealing device for preventing the lubricant from leaking out as well as preventing foreign matters such as the cooling water from entering into the interior of the bearing device. As the rolling bearing for bearing the roll neck 2 there may be used a cylindrical roller bearing besides the tapered roller bearing as shown in the drawings.

Anyway, the rolling bearing for rotably bearing the roll neck 2 of the rolling machine is used in severe atmospheres such as high temperature, high load and varying load. Further, as the rolling machine operates, foreign matters such as the cooling water and rolling scale often enter into the interior of the rolling bearing for bearing roll neck to cause mislubrication. The life of the rolling bearing for bearing roll neck which is subject to such severe conditions during use is not the rolling fatigue life as seen in ordinary rolling bearings. It is affected by the fatigue accompanying surface damages due to mislubrication or sliding friction. In other words, the foregoing rolling bearing often reaches its life due to fatigue accompanying surface damages before reaching rolling fatigue life.

In order to prevent the reduction of the life of rolling bearing forbearing roll neck due to this cause, it has heretofore been practiced to properly design the material and shape of the various members constituting this rolling bearing or the composition of the lubricant to be enclosed in this rolling bearing. Further, it has heretofore been practiced to subject the surface of various members constituting the rolling bearing such as inner ring race 6, outer ring race 8 and rolling surface of tapered rollers 9, 9 to formation to for mamanganese phosphate film or baked molybdenum disulfide film thereon.

The foregoing formation makes it possible to prevent rust of various members constituting the foregoing rolling bearing for bearing roll neck (inner ring 5, outer ring 7a, 7b, rolling elements such as tapered rollers 9, 9) and scoring on the portion at which the inner surface of the inner ring 5 engages the outer surface of the roll neck 2. In other words, by forming a formed film such as manganese phosphate film or baked molybdenum disulfide film on the surface of various members constituting a rolling bearing which is subject to severe conditions during use as mentioned above, so-called metal contact involving direct contact of substrate metal of the various members can be prevented. At the same time, these members can be prevented from being rust.

In accordance with the technique described in above cited JP-A-6-159371, the durability of a rolling sliding member made of an iron-based metal can be improved to some extent. More improvements have been desired to improve further the durability of the rolling sliding member.

For example, in the case of the rolling bearing forbearing roll neck as described above, by forming a formed film on the surface of various members constituting the rolling bearing, the damage and rust of the contact area can be prevented as mentioned above. However, the constituent members which have been merely subjected to formation cannot necessarily exert a sufficient effect. This reason will be described hereinafter. The foregoing formed film can be early peeled in a severe operating atmosphere. In accordance with the conventional treatment involving mere formation, the substrate metal covered by a formed film has a rough surface having a high surface roughness. This is because the surface of the substrate metal is eluted with a solvent during the process of production of the formed film by formation. When this rough surface is exposed with the peeling of the formed film, the effect of preventing rust is lost. Further, the rough surface makes drastic metal contact with its mating surface, causing drastic abrasion that results in damages such as smearing and seizing.

SUMMARY OF THE INVENTION

Under these circumstances, the present invention was made. It is an object of the present invention to provide a rolling sliding member, a process for the production thereof and a rolling sliding unit such as rolling bearing for bearing roll neck, which has a sufficient durability capable of enduring severe conditions during use.

Among the rolling sliding member of the invention, process for the production thereof and sliding unit, the rolling sliding member is made of an iron-based metal and has a surface roughness of 1.2 $\mu$m or less as calculated in terms of Ra or 12 $\mu$m or less as calculated in terms of Rmax at least on the area thereof which comes in contact with the surface of its mating member with relative displacement during use.

The process for the production of a rolling sliding member comprises forming a formed film at least on the area of an iron-based metal which comes in contact with the surface of its mating member with relative displacement during use, and then subjecting the formed film to smoothing for lessening the surface roughness thereof.

The rolling sliding member is made of an iron-based metal and has a formed film provided and has been subjected to smoothing for lessening the surface roughness thereof at least on the area thereof which comes in contact with the surface of its mating member with relative displacement during use.

The rolling sliding units each are made of an iron-based metal and comprise a pair of rolling sliding members which make displacement relative to its mating member during use.

In the rolling sliding unit, one of the pair of rolling sliding members has a formed film provided at least on the area thereof which comes in contact with the surface of its mating member with relative displacement during use while the other has no formed film provided but has a surface roughness of 0.1 $\mu$m or less as calculated in terms of Ra at least on the area thereof which comes in contact with the surface of its mating member with relative displacement during use.

In the rolling sliding unit, the pair of rolling sliding members have a surface roughness of 0.1 $\mu$m or less as calculated in terms of Ra anywhere on the area thereof which comes in contact with the surface of its mating member with relative displacement during use.

Alternatively, though not being defined in the claims, one of the pair of rolling sliding members may have a smoothened formed film provided at least on the area thereof which comes in contact with the surface of its mating member with relative displacement during use while the other may have a formed film provided or may have no formed film provided but have a surface roughness of 0.1 $\mu$m or less (preferably 0.07 $\mu$m or less) as calculated in terms of Ra at least on the area thereof which comes in contact with the surface of its mating member with relative displacement during use.

(Function)

In accordance with the rolling sliding member of the invention, process for the production thereof and rolling sliding unit having the foregoing constitution, interference with protrusions developed when this rolling sliding member makes movement relative to its mating member or a pair of rolling sliding members constituting this rolling sliding unit make movement relative to each other is lessened. In other words, since the surface roughness of the rolling sliding member or unit is so small that minute protrusions present thereon are small, drastic abrasion can be inhibited, making it possible to prevent early peeling of formed film.

Further, even if a formed film is peeled, the process reaching peeling forms a mild phenomenon (phenomenon gradually proceeds over an extended period of time). Accordingly, the substrate which is an iron-based metal undergoes so-called concordance. In other words, the surface roughness of the substrate is lessened before the foregoing formed film is peeled. Therefore, even after the peeling of the formed film, the substrate has sufficient abrasion resistance and seizing resistance.

DETAILED DESCRIPTION OF THE PREFERRED EMBODIMENTS

Figure 1:
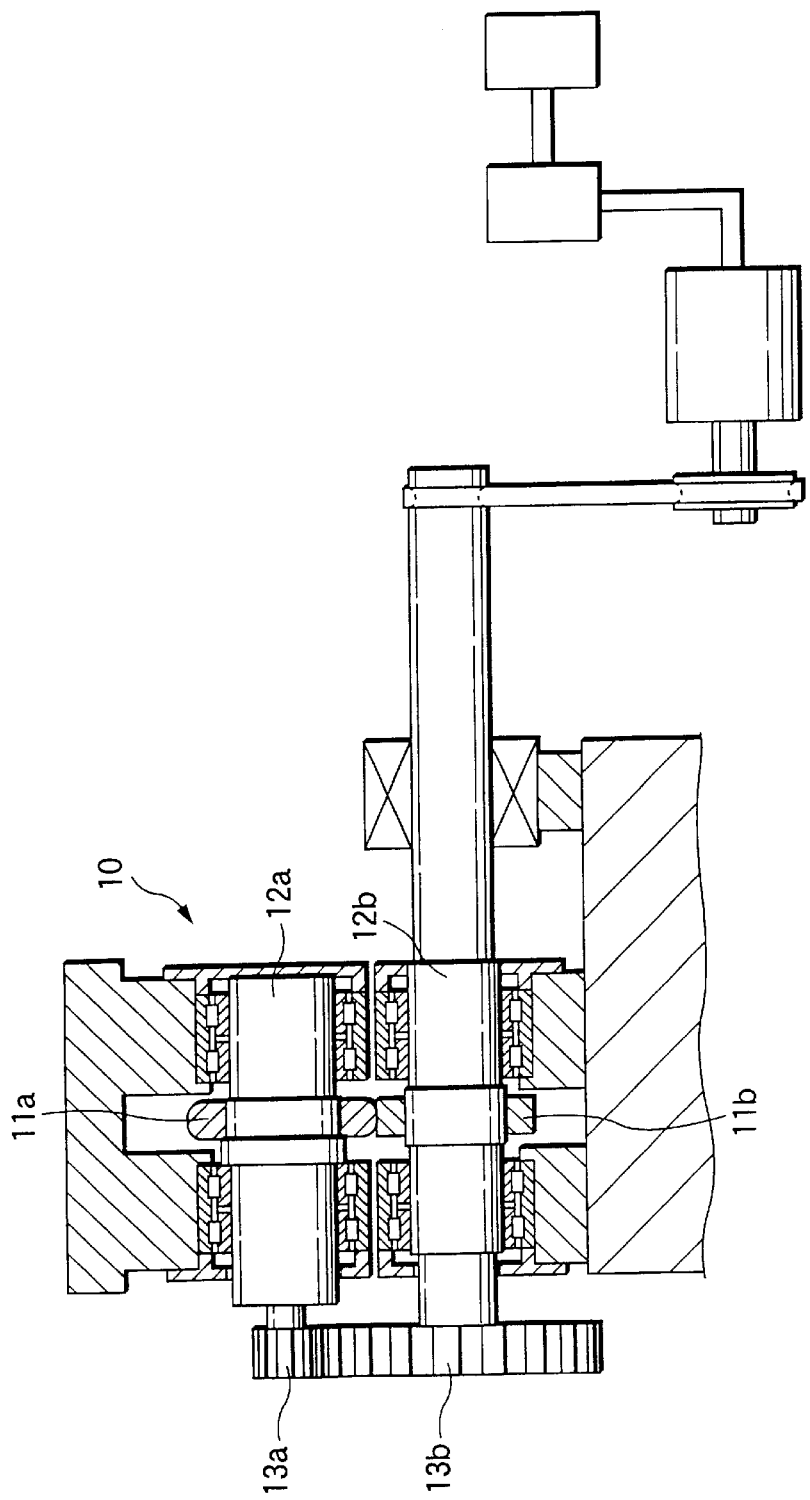
FIG. 1 is a sectional view illustrating a two-cylinder testing machine used in the seizing test.

Embodiments of implication of the invention will be described with reference to the case where a manganese phosphate film is formed as a formed film on the surface of an iron-based metal such as high carbon chromium bearing steel (e.g., SUJ2 (HRC58 or more)) and the durability of the manganese phosphate film on the rolling sliding surface thereof is improved. Even when as a specimen there was used a carburizing steel-based material, no remarkable difference in test results was shown. Therefore, the present embodiment will be described with reference to the results of test made on a specimen obtained by subjecting SUJ2 to heat treatment by dipping in a quenching oil. By subjecting the foregoing rolling sliding surface as the area which comes in contact with the surface of the mating member with relative displacement during use to the foregoing treatment, the durability of the foregoing formed film can be improved. At the same time, even after the peeling of the formed film, a rolling sliding surface having a sufficient abrasion resistance and seizing resistance can be formed.

In order to form the formed film, a surface modifier made of a colloidal manganese compound and an alkaline component (e.g., PL-55 (trade name), produced by Nihon Parkerizing Co., LTD.) is actually used. Using such a surface modifier, formation is effected under the conditions described later (e.g., PF-M1A or PF-M5 (trade name), produced by Nihon Parkerizing Co., LTD.) to produce a crystalline manganese phosphate on the foregoing rolling sliding surface as the foregoing formed film. The surface of the formed film thus produced is then subjected to, e.g., rolling to lessen the surface roughness thereof and hence improve the resistance thereof to abrasion and seizing. The rolling is a working process which comprises rotating a pair of members under a contact load at the same velocity, i.e., allowing the members to come in pure rolling contact with each other so that minute protrusions present on the surface thereof are crushed to smooth the surface thereof. Therefore, this working process is similar to so-called roller varnishing.

The process for forming the formed film to be effected in the implication of the invention is preferably carried out such that the diameter of crystallites constituting the formed film can be reduced to suppress the roughness of the rolling sliding surface and the thickness of the formed film can be reduced. To this end, the formation is preferably effected with a surface modifier having a concentration of from 2 to 8 g/L and a pH value of 9 or more and a forming solution which is a phosphoric acid solution with a pH value of 4.5 or less having manganese dissolved therein in an amount such that the equivalent point is reached when the alkalinity is such that the acid concentration is from 0.2 to 0.5 N. The dissolved amount of manganese is preferably from 2 g/L to 40 g/L (2,000 ppm to 40,000 ppm). The processing temperature is preferably 95° C. or higher. For example, PL-55 (trade name), which a surface modifier produced by Nihon Parkerizing Co., LTD., can be preferably used.

The foregoing surface modifier is made of a colloidal manganese compound and an alkaline component. When the concentration of such a surface modifier falls below 2 g/L, the staring points of crystalline growth are scattered, causing the growth of large size crystals that worsen the surface roughness of the substrate metal. On the contrary, when the concentration of the surface modifier exceeds 8 g/L, the resulting effect of reducing the thickness of the formed film is no longer enhanced. Further, the coagulation of the colloid is accelerated, expediting the deterioration of the surface modifier. Accordingly, the concentration of the surface modifier is preferably from 2 to 8 g/L.

When the foregoing forming solution is a phosphoric acid solution having an acid concentration of more than 0.5 N, the surface of the substrate metal is dissolved at a raised speed, worsening the surface roughness thereof. On the contrary, when the phosphoric acid solution has an acid concentration of lower than 0.2 N, the resulting primary dissociation makes it difficult to produce free phosphoric acid and hence makes it difficult or impossible to allow phosphate crystal to grow. Accordingly, the foregoing forming solution is preferably a phosphoric acid solution with a pH value of 4.5 or less having manganese dissolved therein in an amount such that the equivalent point is reached when the alkalinity is such that the acid concentration is from 0.2 to 0.5 N. PF-M1A and PF-M5 (trade name), which are forming solutions produced by Nihon Parkerizing Co., LTD., can be preferably used.

When the dissolved amount of manganese is 2 g/L (2,000 ppm) or less, the growth of phosphate crystal is slow and only the dissolution of metal is accelerated. On the contrary, when the dissolved amount of manganese is 40 g/L (40,000 ppm), the dissolution of manganese reaches saturation. Accordingly, the dissolved amount of manganese is from 2 g/L to 40 g/L (2,000 ppm to 40,000 ppm).

EXAMPLE

A test made to confirm the effect of the invention will be firstly described. The test was effected using a two-cylinder testing machine 10 as shown in FIG. 1. Under these conditions, the effect of difference in surface treatment on durability was examined. In the two-cylinder testing machine 10, a pair of short-cylindrical specimens 11a, 11b having the same diameter were externally fitted onto the middle part of a pair of rotary shafts 12a, 12b arranged in parallel to each other, respectively, in such an arrangement that they come in elastic contact with each other on the outer surface thereof. The rotary shafts 12a, 12b rotate in opposite directions at different rates by engaged gears 13a, 13b having different numbers of tooth fixed to the respective end thereof. Accordingly, the foregoing pair of specimens 11a, 11b rotate in opposite directions at different rates to undergo relative sliding on the contact area. In order to prevent the occurrence of edge road on the contact area that affects the test results, the specimen 11a was subjected to single arc crowning on the outer surface thereof.

In some detail, the pair of specimens 11a, 11b were subjected to sliding on the contact area at a predetermined rate under a predetermined contact load. For evaluation, the time required until the two specimens 11a, 11b are seized at the contact area was determined. The contact pressure at the contact area was 1.1 GPa. The sliding rate V was 3.2,/s. The surface modifiers used in this test are set forth in Table 1 below.

TABLE 1

| Surface modifier 1 | PL-55 |
| Surface modifier 2 | VMA/VMB |

Among the two surface modifiers set forth in Table 1, "surface modifier 1" is PL-55 (trade name), produced by Nihon Parkerizing Co., Ltd., and "surface modifier 2" is VMA/VMB, produced by the same company. Both the two surface modifiers are colloidal materials. PL-55 undergoes sedimentation at a rate of from 3 to 10 times lower than that of VMA/VMB and thus can prevent the progress of cohesion.

Table 2 shows the level of surface roughness of the specimens.

TABLE 2

| | Ra [$\mu$m] | R$_{max}$ [$\mu$m] |
| --- | --- | --- |
| Roughness 1 | 0.6 or less | 6 or less |
| Roughness 2 | 0.6 to 1.2 | 12 or less |
| Roughness 3 | 1.2 to 2.0 | 20 or less |
| Roughness 4 | 2.0 or more | 10 or more |

Figure 2:
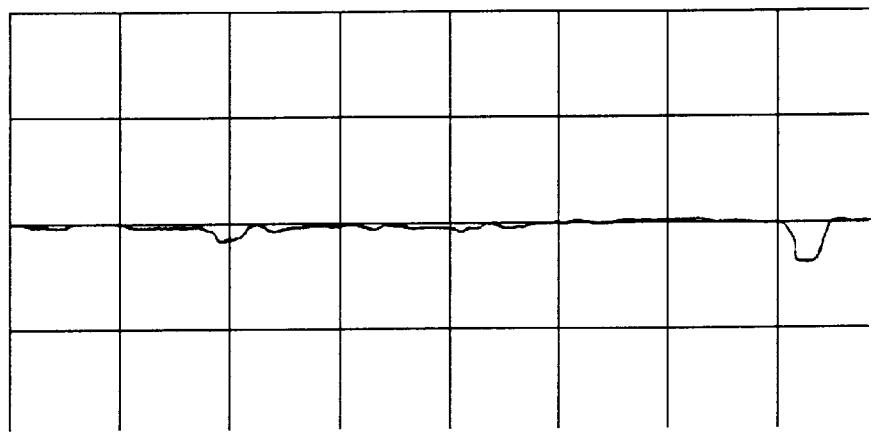
FIG. 2 is a diagrammatic view illustrating the waveform of the surface roughness of a rolled formed film.

As can be seen in Table 2, this test uses 4 levels of roughness. Some of the 4 levels of roughness were obtained by subjecting a specimen having a formed film formed thereon to rolling on the rolling sliding surface thereof. In other words, when a specimen having a roughness level of 2, which had been merely subjected to formation, was subjected to rolling, its surface roughness was lessened to level 1. The resulting specimen was used as a specimen having a roughness level of 1 to be tested for seizing resistance. To be short, various levels of roughness include one obtained by subjecting a material to formation alone and another obtained by subjecting the material thus formed to rolling. The waveform of surface roughness of the formed film having a roughness level of 1 obtained by rolling is shown in FIG. 2. The waveform of surface roughness of the formed film having a roughness level of 2 obtained free from rolling is shown in FIG. 3.

Figure 3:
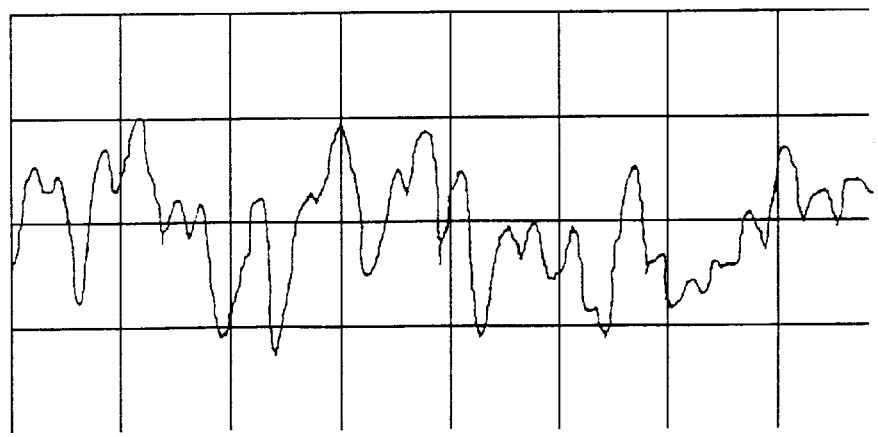
FIG. 3 is a diagrammatic view illustrating the waveform of the surface roughness of a conventional formed film.

As can be seen in the comparison of FIGS. 2 and 3, when the surface of the formed film is crushed and smoothened by rolling, roughness protrusions, i.e., manganese phosphate particles are crushed to smoothen the surface thereof. Thus, the skewness of roughness is negative.

The results of seizing test made on four specimens having different roughnesses as mentioned above are set forth in Tables 3 and 4. For this test, a pair of specimens 11a, 11b having the same surface roughness were used. The time required until seizing occurs was then measured. The seizing time set forth in Tables 3 and 4 is obtained by averaging the seizing time measured on a plurality of samples prepared each for four levels of roughness. The lubricant used was a gear oil for the test the results of which are set forth in Table 3 or a grease for the test the results of which are set forth in Table 4. Among these lubricants, the gear oil exhibited a 40° C. dynamic viscosity of about $1.4 \times 10^{-4}$ [m2/s] (140 [cSt]). As the grease there was used one having almost the same base oil viscosity as that of the gear oil. The symbol ○ in Tables 3 and 4 indicates that defects such as seizing didn't occur when 6 hours passed and the test was then suspended.

TABLE 3

| | Roughness 1 | Roughness 2 | Roughness 3 | Roughness 4 |
| --- | --- | --- | --- | --- |
| Surface modifier 1 | ○ | ○ | 38 minutes | 21 minutes |
| Surface modifier 2 | ○ | 42 minutes | 27 minutes | 10 minutes |

TABLE 4

| | Roughness 1 | Roughness 2 | Roughness 3 | Roughness 4 |
| --- | --- | --- | --- | --- |
| Surface modifier 1 | ○ | 45 minutes | 30 minutes | 14 minutes |
| Surface modifier 2 | ○ | 32 minutes | 22 minutes | 10 minutes |

As can be seen in Tables 3 and 4, the specimen having a high level of roughness obtained by using the surface modifier 1, i.e., PL-55 exhibits an excellent seizing resistance while the specimen having a low level of roughness obtained by using the surface modifier 2, i.e., VMA/VMB exhibits a poor seizing resistance.

The observation of the difference between gear oil and grease shows that the gear oil comprises an extreme-pressure additive incorporated therein and thus exhibits excellent lubricating properties while under the conditions that a lubricant having relatively low lubricating properties such as grease the seizing time determined by test tends to be short. However, even in this case, the specimen having a "roughness level of 1" exhibits an excellent seizing resistance in any case regardless of lubricating conditions. Among the foregoing testing conditions, PV value is a very severe factor which acts on the sliding surface which is commonly used. Accordingly, the fact that no seizing occurs when 6 hours passed means that the specimen can practically withstand seizing sufficiently.

As can be seen in the test results mentioned above, by subjecting the surface of an iron-based metal to formation for providing little surface roughness as in the invention, or by subjecting the formed film to smoothing for lessening the surface roughness thereof, the seizing resistance of the rolling sliding surface can be improved. This is because when the surface roughness of the formed film is lessened, interference with the tip of minute protrusions reduced when the rolling sliding surface makes relative movement can be lessened to inhibit drastic abrasion, making it possible to prevent early peeling of the surface layer of the formed film. Further, even if the surface layer of the formed film is peeled, the process reaching peeling gradually proceeds. Accordingly, the substrate undergoes so-called concordance. In other words, the surface roughness of the substrate is lessened before the foregoing formed film is peeled. Therefore, even after the peeling of the formed film, the substrate has sufficient abrasion resistance and seizing resistance.

The reason why different surface modifiers give different seizing resistances is that the use of surface modifier PL-55 provides a good colloid dispersion. In other words, when a good colloid dispersion is given, formation under the same conditions provides phosphate crystals having a diameter of from 0.3 to 0.6 times that obtained using VMA/VMB. Further, formation using PL-55 allows the production of dense crystals and dense pits produced by corrosion as compared with VMA/VMB. In other words, the surface roughness of the substrate which has been formed can be lessened. Further, even when the formed film is peeled to cause the surface of the substrate metal to be exposed, the surface of the substrate metal is kept dense, giving a large true contact area that lessens the concentration of stress onto roughness protrusions and drastic abrasion on these protrusions.

Figure 4A:
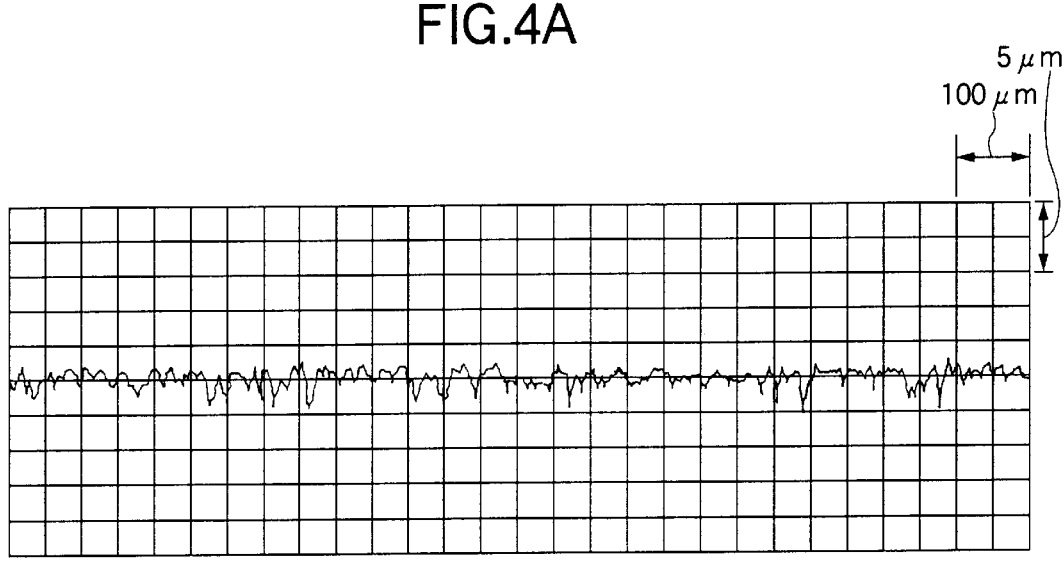
FIG. 4 is a diagrammatic view illustrating the surface roughness of a substrate metal before and after being subjected to seizing test wherein FIG. 4(A) indicates the waveform of surface roughness before test while FIG. 4(B) indicates the waveform of surface roughness after test.
Figure 4B:
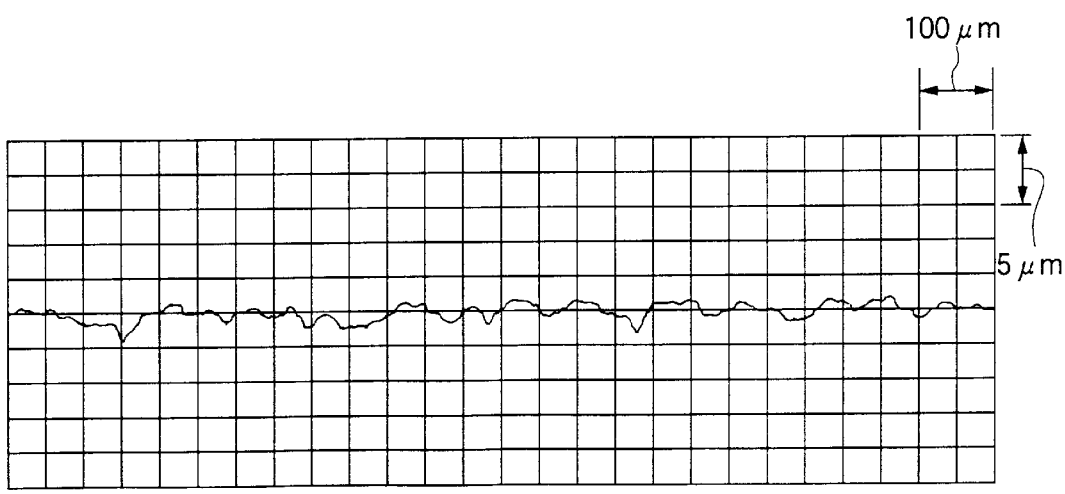

FIG. 4(B) illustrates the waveform of roughness on the sliding area of a specimen which under went no seizing after test. FIG. 4(A) illustrates the waveform of roughness on the same specimen as used in FIG. 4(B) which has not been subjected to seizing test but has been provided with a formed film and then freed of formed film to allow the substrate metal to be exposed. As can be seen in FIG. 4, the tested surface of the specimen which underwent no seizing has many dents developed by the peeling of formed film but has crushed protrusions. Since the untested surface of the substrate metal has roughness protrusions, it can be seen that the surface of metal is abraded during test to lose roughness protrusions.

Further, pits formed by corrosion during formation are left as they are. The surface having such pits provides improvement of lubricating properties as described in Japanese Patent No. 2,724,219. In other words, the provision of the manganese phosphate film allows the protrusions on the substrate metal to be slowly removed during the peeling of the surface layer. Further, the pits formed during formation act as oil reservoir, providing the substrate metal thus freed of formed film with an excellent seizing resistance. Moreover, the abrasion on the substrate metal occurs only on the tip of protrusions and thus proceeds slowly. Therefore, the resulting abrasion powder is so minute that the operating characteristics and life cannot be adversely affected.

The present invention contemplates the formation of a formed film such as manganese phosphate film on a surface having pits but free of big protrusions allowing the formation of the desired formed surface without any special removal process or running in. To this end, it is important that the surface roughness of the formed film is lessened to improve the peeling resistance thereof and the pits developed by corrosion on the surface of the substrate metal are dense and small. Further, in the present invention, a formed film having a soft surface suffices. The formed film of the invention doesn't have a hard surface similarly to those developed by the technique described in Patent No. 2,724,219. Thus, the formed film of the invention can be used also with a mating rolling sliding member made of a relatively soft material such as low carbon steel.

Of course, the degree of surface roughness of the substrate metal varies with the degree (good or poor) of surface roughness of the unformed metal member. It is difficult to control the surface roughness of the formed substrate metal from the standpoint of quality control. However, since the surface roughness of the formed film reflects that of the substrate metal, the surface roughness of the substrate metal can be controlled with the surface roughness of the formed film as a measure. Taking into account these factors, the analysis of the foregoing test results gives a proposal that the surface roughness of the formed film be 1.2 $\mu$m or less (more preferably 0.6 $\mu$m or less) as calculated in terms of Ra or 12 $\mu$m or less (more preferably 6 $\mu$m or less) as calculated in terms of $R_{max}$ to improve the seizing resistance thereof. How much the surface roughness of the metal member should be before the formation of formed film can be determined taking design consideration made by experiments or the like.

In the case of rolling sliding member which is used under severe lubricating conditions, PL-55 is preferably used as a surface modifier for forming formed film. However, in this case, too, the surface modifier to be used is not limited to PL-55. For example, any surface modifier which undergoes sedimentation at a low rate can be used to advantage. More preferably, the surface of the formed film thus obtained is subjected to rolling so that the roughness protrusions are crushed to lessen the surface roughness of the formed film. The process for lessening the surface roughness of the formed film is not limited to rolling. Any other processes such as rolling, shot peening, honing, lap finishing, barrel finishing and grinding can be used so far as only the roughness protrusions can be removed. However, rolling is advantageous in that the interposition of a soft formed film such as manganese phosphate film makes it possible to increase the diameter of tip of protrusions on the surface of metal without damaging the surface of metal as well as generate residual compression stress on the surface of metal. Further, rolling is not limited to those similar to roller varnishing mentioned above. For example, an assembled tapered roller bearing can be operated under an axial load so that one of the bearing rings is smoothened. In other words, rolling sliding may be made on the rolling sliding surface under a predetermined face pressure.

The formed film to be formed on the rolling sliding surface is not limited to manganese phosphate film but may be any other formed film. Anyway, by predetermining the surface roughness of the formed film obtained by forming a crystal on the surface of metal to 1.2 $\mu$m or less as calculated in terms of Ra or 12 $\mu$m or less as calculated in terms of $R_{max}$, or by subjecting the material to rolling for lessening surface roughness to give the foregoing roughness, the damage resistance of the surface of metal can be improved.

In order to lessen the surface roughness of the formed film formed on the rolling sliding surface, the chemicals need to be properly controlled and adjusted. However, taking into account the actual production process, the control over the conditions of the chemicals which change momentarily can hardly be conducted and adds to cost. Thus, rolling is an effective method for lessening the surface roughness of formed film. In other words, in order to implement the present invention, it is important to firstly form a film having little surface roughness. Rolling is considered a secondary film working.

In the implementation of the present invention, the thickness of the formed film is not specifically limited. However, when a formed film having a surface roughness such that an excellent seizing resistance can be given is produced, its thickness is about 5 $\mu$m or less. Nevertheless, even if the thickness of the film is 5 $\mu$m or less, the seizing time is reduced when the surface roughness is high.

Further examples of the effect of the invention include reduction of abrasion by reduction of surface roughness, enhancement of dimensional accuracy by further reduction of thickness of the formed film attained by crushing protrusions, and improvement of mountability.

Figure 5A:
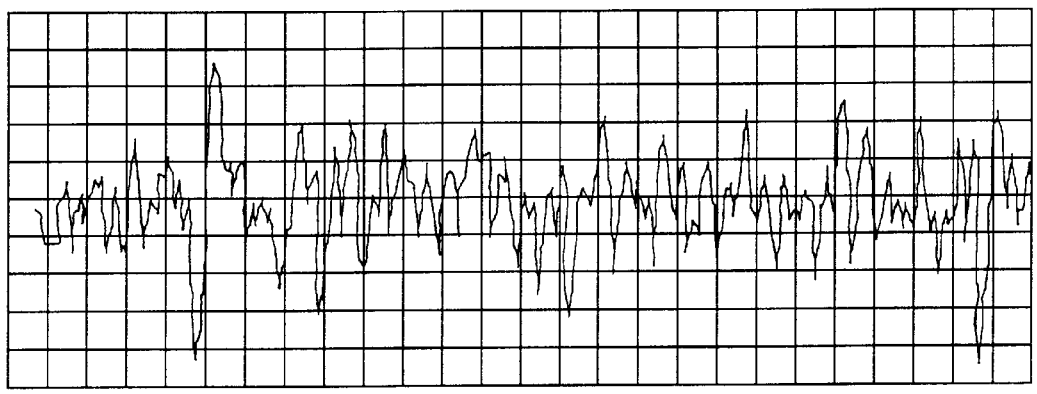
FIGS. 5(A) and 5(B) are diagrammatic views illustrating the effect of whether or not rolling is effected after formation of formed film on the surface roughness.
Figure 5B:
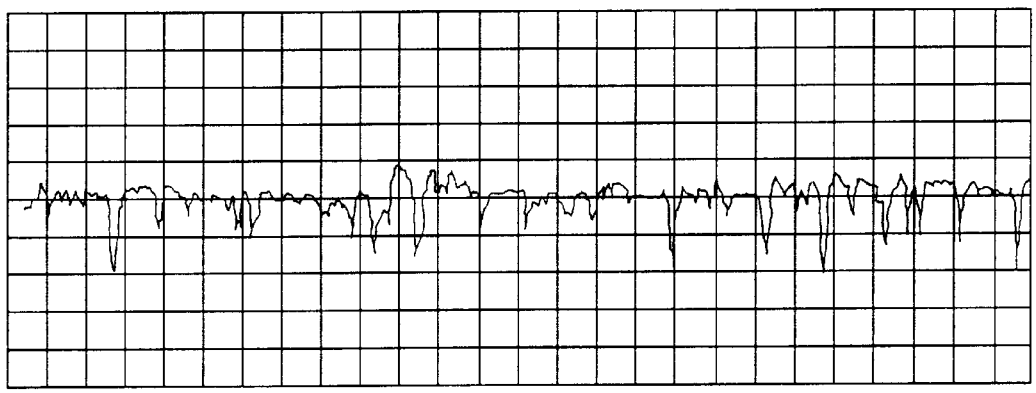
Figure 6A:
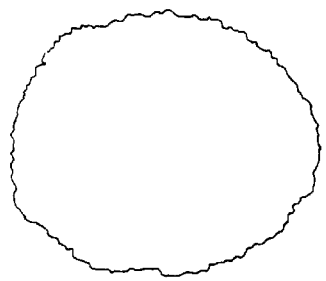
FIGS. 6(A) and 6(B) are diagrammatic views illustrating the effect of whether or not rolling is effected after formation of formed film on the out-of-roundness.
Figure 6B:
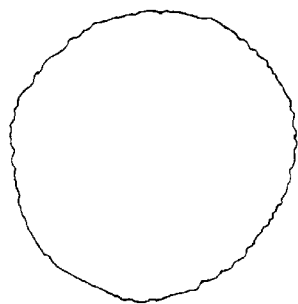

An experiment made to confirm the effect of whether or not rolling is effected after the formation of the formed film on the surface roughness and out-of-roundness of rolling sliding parts will be described in connection with FIGS. 5 and 6. In this experiment, a manganese phosphate film was formed on a conical outer ring race formed on the inner surface of the outer ring constituting a tapered roller bearing having an inner diameter of 75 mm, an outer diameter of 160 mm and a width of 40 mm. The outer ring race was then subjected to rolling. The outer ring race having a manganese phosphate film formed thereon was measured for surface roughness and out-of-roundness before and after rolling. The measurements of surface roughness are shown in FIG. 5. The measurements of out-of-roundness are shown in FIG. 6. In these measurements of surface roughness and out-of-roundness shown in FIGS. 5 and 6, the symbol (A) indicates the conditions of the unrolled formed film, and the symbol (B) indicates the conditions of the rolled formed film. As can be seen in FIGS. 5 and 6, by subjecting the rolling sliding parts having a formed film (manganese phosphate film) formed thereon to rolling, the surface roughness and out-of-roundness of the foregoing outer ring race can be improved. As a result, the various properties of the tapered roller bearing having the foregoing outer ring incorporated therein can be improved.

In order to improve the seizing resistance among the various properties, the inventors operated the foregoing tapered roller bearing at 1,250 min$^{-1}$ (r.p.m.) under an axial load of 4,900 N (500 kgf) and measured the temperature of the outer ring under a stabilized state. As a result, the temperature of the rolled outer ring reached a value as low as 57° C. while the temperature of the unrolled outer ring reached a value as high as 72° C. As can be seen in this experiment, the present invention can make distribution to the improvement of the properties such as seizing resistance of various rolling sliding parts including the constituent parts of rolling bearing.

The foregoing experiment has been described with reference to the case where the outer ring race is subjected to rolling to improve the surface roughness and out-of-roundness thereof. However, in the case of parts which make rolling contact with its mating member under a load such as constituent parts of tapered roller bearing, the assembly can be operated at a rotary speed such that no seizing occurs under a load to crush minute unevenness present on the surface of formed film and hence effect smoothing. The area which can hardly be subjected to working involving strong pressurization against the mating surface such as rolling, e.g., inner surface of the pocket of retainer can be subjected to barrel varnishing to undergo the foregoing smoothing.

Another experiment made to confirm the effect of the invention will be described. This experiment, too, was effected using the two-cylinder testing machine 10 as shown in FIG. 1. In this experiment, the pair of specimens 11$a$, 11$b$ were operated at a predetermined sliding rate under a predetermined contact load on the contact area. Under these conditions, the time required until the contact area of the two specimens 11$a$, 11$b$ undergoes seizing was then determined to evaluate durability. The face pressure P of the foregoing contact area was 1.1 GPa. The sliding velocity V was 3.2 m/s. The contact area of the two specimens 11$a$, 11$b$ was lubricated with a grease having a 40° C. dynamic viscosity of about $1.4\times10^{-4}$ m$^2$/s (140 cSt).

The durability test using the foregoing two-cylinder testing machine 10 lasted 120 minutes. When seizing occurred earlier, the durability test was suspended at that point.

Table 5 illustrates the surface conditions of 6 specimens subjected to the foregoing durability test.

TABLE 5

| Specimen | Surface roughness Ra [μm] | Surface treatment |
| --- | --- | --- |
| A | 0.2 | |
| B | 0.1 | |
| C | 0.07 | |
| D | 0.05 | |
| E | 0.6 | Manganese phosphate film |
| F | 0.3 | Manganese phosphate film + rolling |

Among the 6 specimens A to F set forth in Table 5 above, 'the specimens A to D have different surface roughnesses but were not subjected to surface treatment. The remaining two specimens E and F were subjected to formation to for mamanganese phosphate film on the surface thereof. However, the surface roughness of the specimen F was smaller than that of the specimen E. In the present embodiment, the surface roughness of the specimen F was lessened by rolling. The rolling was carried out by rotating a pair of specimens E mounted on the foregoing two-cylinder testing machine 10 at the same velocity in opposite directions under a predetermined load on the contact area of the two specimens E. Accordingly, the pair of gears 13$a$, 13$b$ mating each other have the same number of tooth.

By this rolling, the surface roughness of the relatively rough specimen E was crushed to effect smoothing. Thus, the foregoing specimen F having a small surface roughness was obtained. FIG. 5 above illustrates the waveform of the surface roughness of the specimen before this rolling. As mentioned above, the symbol (A) illustrates the waveform of the surface roughness of the foregoing specimen E which is not yet subjected to this rolling while the symbol (B) illustrates the waveform of the surface roughness of the foregoing specimen F which has been subjected to this rolling. In FIG. 5, the magnification of the ordinate is 2,000 while the magnification of the abscissa is 100. As can be seen in FIG. 5, the surface of the specimen F obtained by rolling the specimen E has a smooth surface developed by crushing the roughness protrusions, i.e., film grains.

In order to determine a preferred combination of the foregoing 6 specimens A to F, the same kind of specimens were subjected to durability test under the same conditions as mentioned above as the specimens 11$a$, 11$b$ to be mounted on the foregoing two-cylinder testing machine 10 as set forth in Table 6 below.

TABLE 6

| Test No. | 1 | 2 | 3 | 4 | 5 | 6 |
| --- | --- | --- | --- | --- | --- | --- |
| Specimen 11a | A | B | C | D | E | F |
| Specimen 11b | A | B | C | D | E | F |

Figure 7:
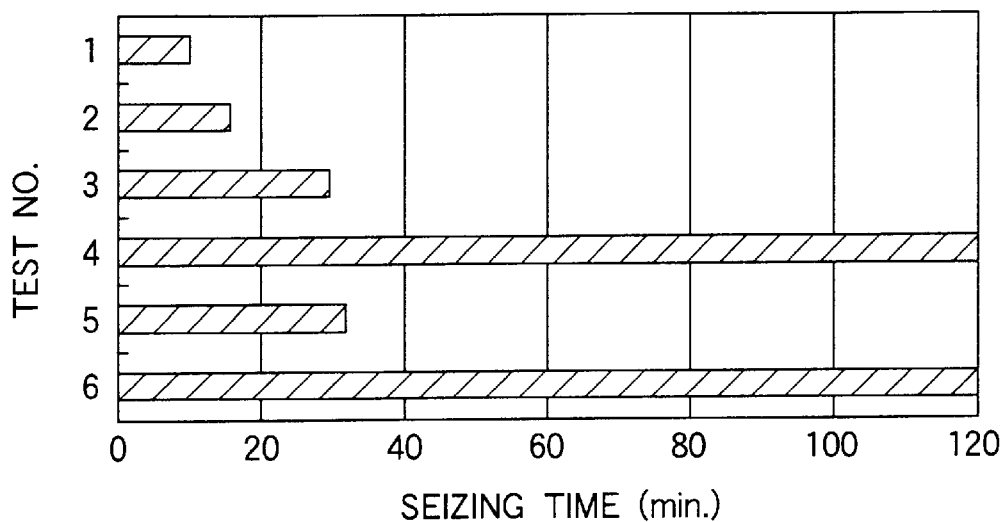
FIG. 7 is a graph illustrating the results of test wherein the same kind of specimens are allowed to make sliding contact with each other.

The results of this experiment thus made are shown in FIG. 7. In FIG. 7, those showing a seizing time of 120 minutes are considered to have undergone no seizing. Referring to PV value represented by the product of contact face pressure P and sliding velocity V, the foregoing testing conditions are far severer than the actual operating conditions. Accordingly, the durability of 120 minutes or more is a practically sufficient value.

As can be seen in the test the results of which are shown in FIG. 7, when the same kind of specimens 11$a$, 11$b$ are allowed to come in contact with each other, no seizing occurs on the unformed specimens if the surface roughness Ra is 0.05 μm or less (Test No. 4). On the contrary, the formed specimen exhibits an enhanced durability as compared with the unformed specimen even if it has a great surface roughness. In order to improve durability sufficiently, the surface-formed specimen may be smoothened (to Ra of 0.4 μm or less) by rolling (Test No. 6).

As the specimens 11a, 11b to be mounted on the foregoing two-cylinder testing machine 10 there were used those having different properties, i.e., a pair of specimens one of which having been subjected to formation as set forth in Table 7. These specimens were subjected to durability test under the same conditions as mentioned above.

TABLE 7

| Test No. | 7 | 8 | 9 | 10 | 11 | 12 | 13 | 14 | 15 |
|---|---|---|---|---|---|---|---|---|---|
| Specimen 11a | E | E | E | E | F | F | F | F | F |
| Specimen 11b | A | B | C | D | A | B | C | D | E |

Figure 8:
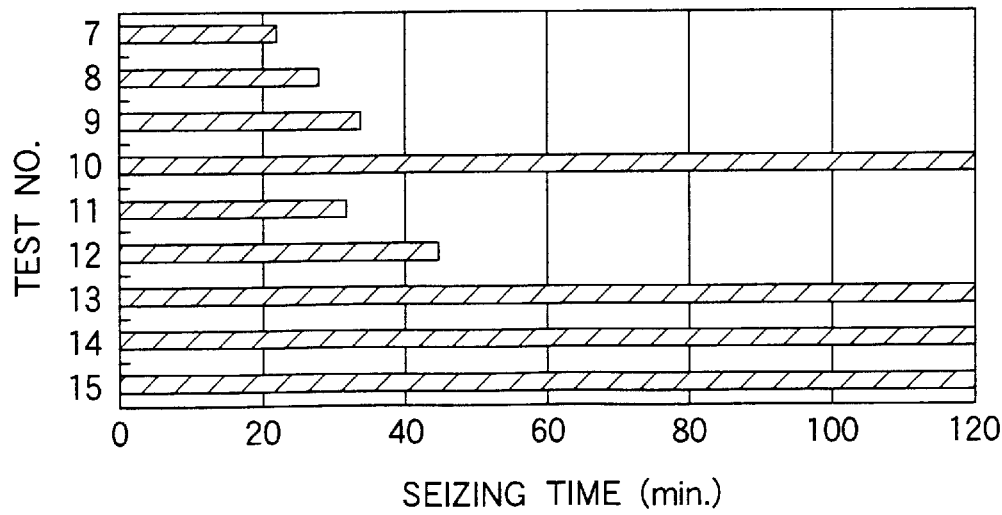
FIG. 8 is a graph illustrating the results of test wherein different kinds of specimens are allowed to make sliding contact with each other.

The results of this test thus made are shown in FIG. 8. The presentation of FIG. 8 is the same as that of FIG. 7 above.

As can be seen in the test the results of which are shown in FIG. 8, when a formed specimen is used untreated (without being smoothened by rolling), the surface roughness of the mating member needs to be 0.05 μm or less as calculated in terms of Ra (Test No. 10) to provide sufficient durability. On the contrary, when a formed specimen which has been smoothened by rolling is used, the mating member may be merely subjected to formation (Test No. 15) to provide sufficient durability. Alternatively, the mating member may have a surface roughness of 0.07 μm or less as calculated in terms of Ra even if it has not been subjected to formation to provide sufficient durability (Test No. 13, 14). As can be seen in the test results, the effect of providing a good seizing resistance is high in the order of F, D, E and C. Table 8 below illustrates combinations which can provide sufficient durability when the 4 specimens C to F among the 6 specimens A to F set forth in Table 5 are used as the constituent parts of a rolling bearing. In Table 8, the symbol ○ indicates a combination giving sufficient durability. The symbol × indicates a combination giving insufficient durability.

TABLE 8

| | | Bearing ring | | | |
|---|---|---|---|---|---|
| | | F | D | E | C |
| Rolling element | F | ○ | ○ | ○ | ○ |
| | D | ○ | ○ | ○ | |
| | E | ○ | ○ | × | × |
| | C | ○ | | × | × |

As can be seen in Table 8 and Table 5, the following combinations (1) to (3) can be proposed to realize a rolling bearing having an excellent durability.
(1) A formed film is formed at least on one of the inner ring race and outer ring race and the rolling surface of the various rolling elements. The surface on which no formed film is formed has a surface roughness of 0.1 μm or less (preferably 0.05 μm or less) as calculated in terms of Ra.
(2) At one of the inner ring race and outer ring race and the rolling surface of the various rolling elements is subjected to formation followed by smoothing to form a smoothened film. The other surface is subjected to formation to form a formed film or is provided with a surface roughness of 0.1 μm or less (preferably 0.07 μm or less) as calculated in terms of Ra.
(3) The surface roughness of both the inner ring race and outer ring race and the rolling surface of the various rolling elements is 0.1 μm or less (preferably 0.05 μm or less) as calculated in terms of Ra.

Consideration will be given to the reason why the foregoing combinations (1) to (3) can provide a rolling bearing with an improved seizing resistance.

Firstly, the foregoing combination (3) means that the prevention of damage on the sliding surface of the rolling bearing can be attained by lessening the surface roughness (Test No. 4). This is because under sufficient lubrication the surface roughness decreases, raising relative value representing the lubricating properties of rolling bearing, i.e., so-called A value. As a result, interference between metal protrusions is lessened, preventing drastic abrasion. On the contrary, when an oil film having a sufficient thickness cannot be obtained due to mislubrication or other defects, the occurrence of metal contact at the sliding surface cannot be avoided. However, by lessening the surface roughness, the true contact area can be raised. Further, since the size of the protrusions is small, sudden abrasion can be prevented. It can therefore be thought that the resulting concordance prevents damage on the sliding surface.

The foregoing combination (2) means that even when the sliding surface of the rolling bearing is subjected to formation, the properties of the formed film and the mating surface, too, are important to provide sufficient durability. In other words, in the case where the foregoing sliding surface has been subjected to formation, no metal contact occurs in the initial stage of operation. However, in the case where the sliding surface has been merely subjected to formation (Test No. 5), the presence of grains constituting the formed film raises the surface roughness of the sliding surface and thus causes protrusion interference. Accordingly, early drastic abrasion occurs, causing the grains (surface layer) to be peeled. As a result, the rough substrate is exposed, causing damage on the sliding surface. On the contrary, by previously rolling the surface of the formed film to give a smooth surface (Test No. 6), the progress of abrasion of the surface layer can be slowed down, allowing the substrate to be gradually exposed. Accordingly, the substrate undergoes so-called concordance, preventing a drastic surface damage leading to seizing.

The foregoing combination (1) means that even when the sliding surface of the rolling bearing is subjected to formation, the properties of the mating surface is also important to provide sufficient durability. Namely, in a case (Test No. 10) that the smoothing surface (the metal surface of the mating member) having surface roughness of 0.1 μm or less (preferably, 0.05 μm or less) is brought in sliding contact with the formed film, no surface damage is occurred, because the metal surface of the mating member is gradually changed to be a smooth surface while projections formed on the metal surface of the mating member is subject to deformation (i.e., a head portion cutting function) In contrary to this, when the surface roughness of the metal surface of the mating member is higher than 0.1 μm (preferably, 0.05 μm), the surface damage is possibly occurred because it seems that a friction on the surface layer of the formed film is accelerated.

The combination of metal surfaces as defined in the invention can be applied not only to the combination of the race and the rolling surface of rolling bearing but also to the sliding surface of the rib portion of tapered roller bearing and the end face of rolling element.

In the case where the invention defined in claim 2 among the present inventions is implemented, smoothing of the formed film is carried out by rolling. This rolling is similar to roller varnishing in terms of ordinary working process. This roller varnishing is a working process for improving the surface properties of a metal. In some detail, a roller having a high accuracy in rotation which is sufficiently harder than the object to be worked is pressed against the object to be worked while being rolled. On the other hand, the foregoing rolling is intended to crush the grains present on the surface of the formed film. Since the grains are softer than the substrate metal and follow the shape of the substrate metal, they can be easily formed. Thus, the rolling can be easily carried out as compared with the foregoing roller varnishing. The treatment for smoothing the surface of the formed film is not limited to the foregoing rolling but can be accomplished also by shot peening, grinding or the like.

Figure 9:
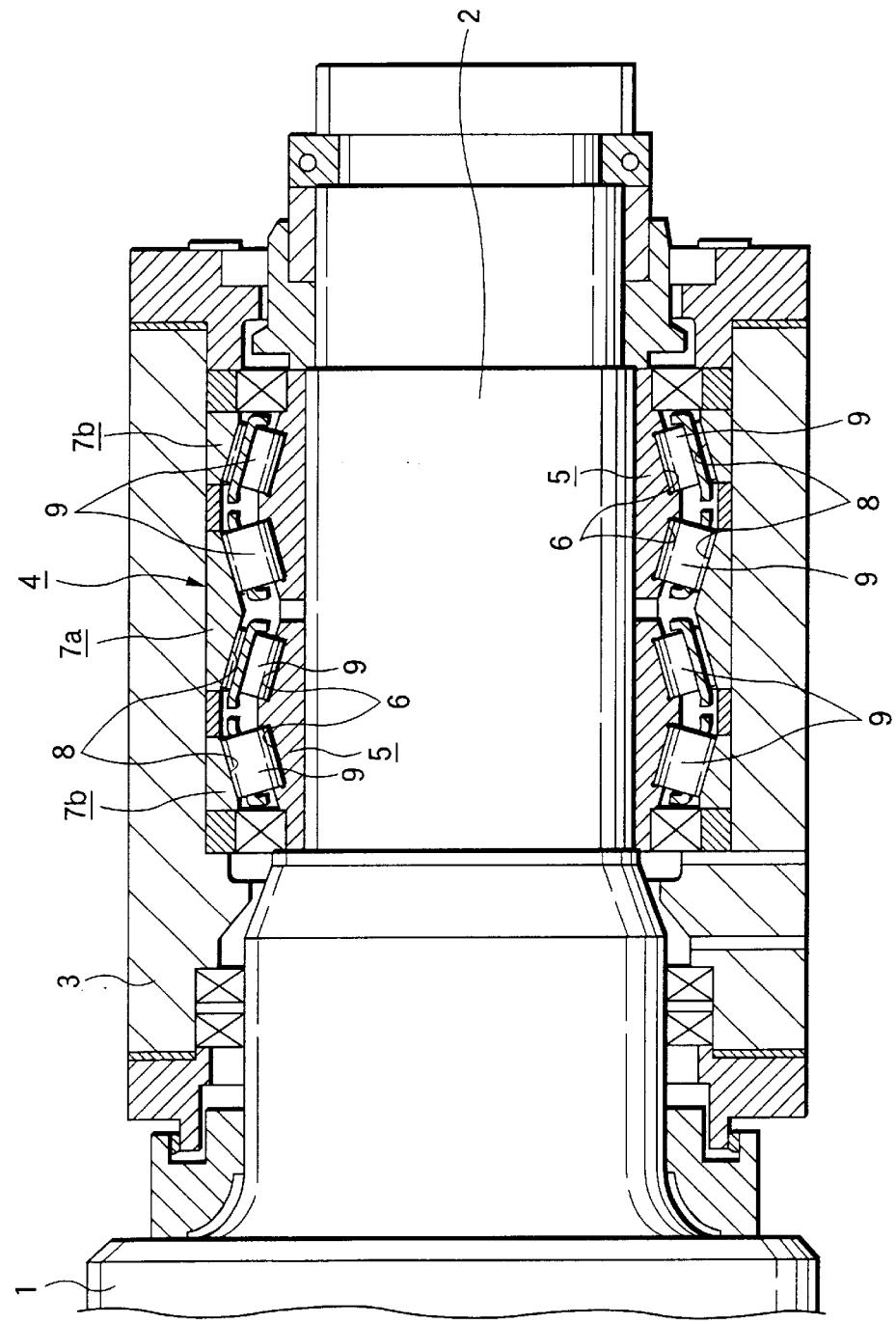
FIG. 9 is a sectional view illustrating a bearing device for rotatably bearing the roll neck for roll for rolling metal.
Figure 10:
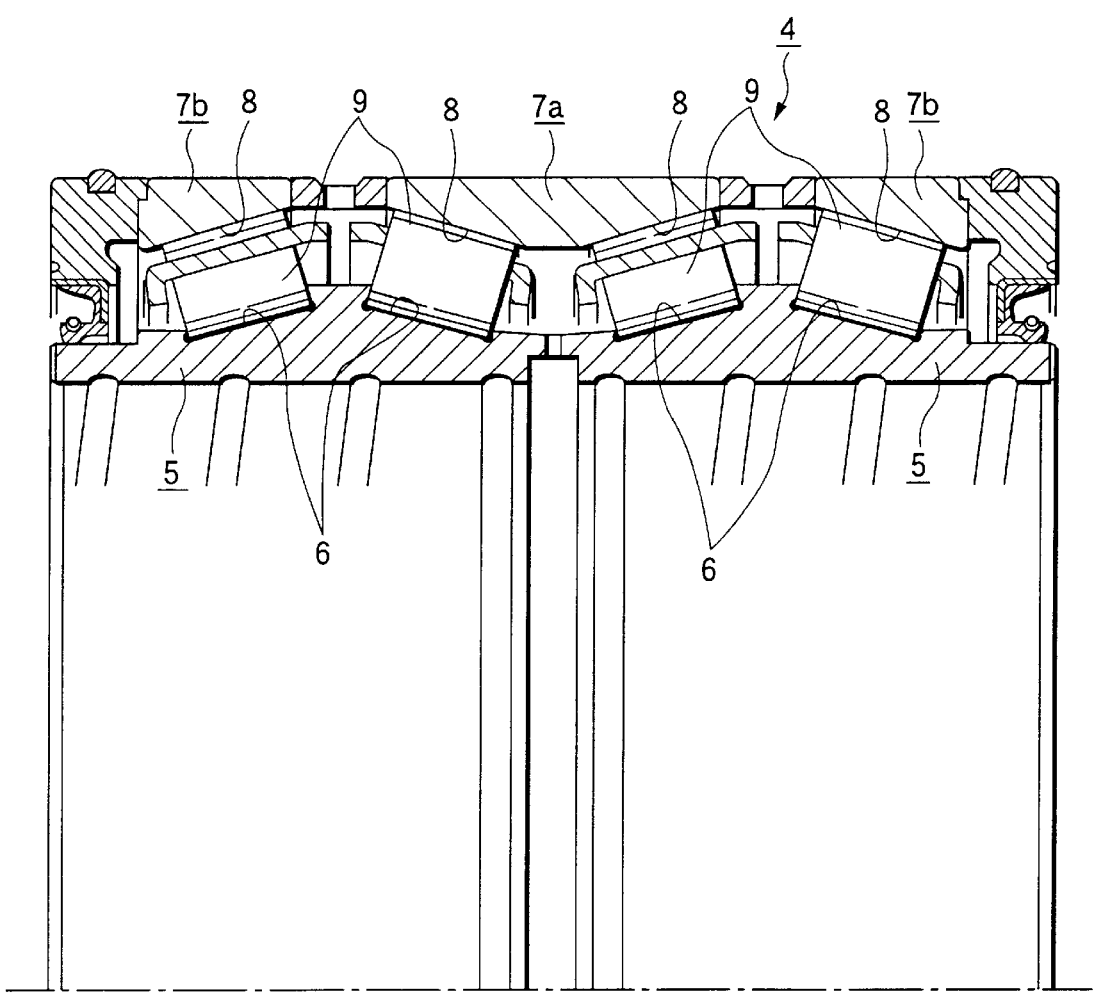
FIG. 10 is semi-sectional view of the bearing constituting the bearing device of FIG. 9.

Which should be employed among the foregoing combinations (1) to (3) to implement the invention by the rolling bearing for roll neck shown in FIGS. 9 and 10 depends on the operating conditions of the roller having a roll neck 2. For example, in the case where it is apprehended that the roll neck 2 is subject to smearing, it is proposed as in the combination (1) that at least one of the inner ring race 6 and outer ring race 8 and the rolling surface of the tapered rollers 9, 9 corresponding to rolling elements (preferably the entire surface of the bearing rings) be subjected to formation and the unformed surface be provided with a surface roughness of 0.1 μm or less (preferably 0.05 μm or less) as calculated in terms of Ra. In the case where the entrance of foreign matters such as cooling water is remarkable as in the rolling bearing for bearing the roll neck 2 on the end face of a work roll for directly rolling a metal plate, it is proposed as in the combination (2) that at least one of the inner ring race 6 and outer ring race 8 and the rolling surface of the tapered rollers 9, 9 be subjected to formation followed by smoothing to form a smoothened formed film thereon and the other surface be subjected to formation to form a formed film or provided with a surface roughness of 0.1 μm or less (preferably 0.07 μm or less) as calculated in terms of Ra. In the case where little foreign matters such as cooling water enter so that no rust prevention is required as in the rolling bearing for bearing the roll neck 2 on the end face of backup roll, it is proposed as in the combination (3) that both the inner ring race 6 and outer ring race 8 and the rolling surface of the tapered rollers 9, 9 be provided with a surface roughness of 0.1 μm or less (preferably 0.05 μm or less) as calculated in terms of Ra but be not subjected to formation. This arrangement can be applied to the rib surface of the inner ring and the end face of the rollers to prevent seizing between rib and rollers.

The technique for improving the durability of surfaces which make mutual rolling or sliding contact as defined in the invention can be applied not only to rolling bearing for bearing roll neck but also to the improvement of durability of formed film provided for the purpose of preventing corrosion or like purposes or the prevention of damage on the surface of ordinary rolling bearings such as prevention of skitting and seizing between rib surface and end face of rollers as seen in tapered roller bearing or cylindrical roller bearing.

A test made to confirm the durability of the invention applied to rolling bearing will be described hereinafter with reference to the case where a double-row tapered roller bearing is used. In this test, this double-row tapered roller bearing was operated at a constant speed under grease lubrication while being repeatedly given an impact of radial load so that a sliding friction occurred at the contact area of the race and the rolling surface of the double-row tapered roller bearing. After a predetermined period of time, the double-row tapered roller bearing was disassembled for inspection. The running surface was then examined for damage. The results of test are set forth in Table 9 below.

TABLE 9

| Example No. | Race (inner ring race and outer ring race) | | Rolling surface (outer surface of tapered roller) | | External appearance after test |
|---|---|---|---|---|---|
| | Surface treatment | Roughness Ra (μm) | Surface treatment | Roughness Ra (μm) | |
| Example 1 | Manganese phosphate film + rolling | — | Manganese phosphate film | — | No damage |
| Example 2 | Manganese phosphate film | — | No formed film | 0.05 | No damage |
| Example 3 | No formed film | 0.1 | No formed film | 0.05 | No damage |
| Comparative Example 1 | No formed film | 0.1 | No formed film | 0.16 | Smearing |
| Comparative Example 2 | Manganese phosphate film | — | No formed film | 0.16 | Smearing |

As can be seen in the test the results of which are set forth in Table 9, by applying the rolling sliding member of the invention to rolling bearing, damage on the sliding surface of bearing can be prevented. For example, the seizing resistance of the rolling sliding surface can be improved.

Firstly, in the case of Example 1, a manganese phosphate film is formed on the race and the rolling surface. Further, the surface of the manganese phosphate film on the race is subjected to rolling so that it is smoothened. In this example, by subjecting the surface of the manganese phosphate film on the race to rolling so that it is smoothened, protrusion interference between the grains of the formed film developed when the rolling sliding surfaces make relative movement can be lessened, inhibiting sudden abrasion and hence making it possible to prevent early peeling of the surface layer of the manganese phosphate film which is a formed film. As a result, the abrasion resistance of the formed film can be improved. Further, even when the surface layer of the formed film is peeled, the process reaching peeling gradually proceeds, causing the substrate metal to undergo so-called concordance. In other words, the surface roughness of the substrate metal is lessened before the peeling of the formed film. Accordingly, even after the peeling of the formed film, the substrate metal can be provided with sufficient abrasion resistance and seizing resistance.

In the case of Example 2, one of the sliding surfaces is a formed surface while the other is an unformed metal surface.

In this example, since the grains of formed film are softer than the protrusions on the mating metal surface, the tip of the metal protrusions can be removed without giving serious damage to the metal surface (head-cutting action). This head-cutting action (so-called concordance) on the grains of formed film on the metal surface proceeds fairly when the surface roughness of the mating metal surface is 0.1 μm or less (preferably 0.05 μm or less) as calculated in terms of Ra. However, when the surface roughness of the mating metal surface exceeds 0.1 μm, the manganese phosphate film which is a formed film relatively softer than the rough metal surface undergoes drastic damage. Accordingly, it can be thought that the formed film falls off and causes metal contact that leads to damage before concordance proceeds.

In the case of Example 3, none of a pair of rolling sliding surfaces which make mutual rolling contact is subjected to formation, but the surface roughness of the two rolling sliding surfaces are each predetermined to be 0.1 μm or less. In this example, since the surface roughness is small, the value representing the lubricating properties of the rolling bearing, i.e., so-called Λ value shows a relative rise under sufficient lubrication, lessening protrusion interference between metal surfaces and hence making it possible to inhibit drastic abrasion. On the contrary, when an oil film having a sufficient thickness cannot be obtained due to mislubrication or other defects, the occurrence of metal contact at the sliding surface cannot be avoided. However, by lessening the surface roughness, the true contact area can be raised. Further, since the size of the protrusions is small, sudden abrasion can be prevented. It can therefore be thought in Example 3, too, that the resulting concordance prevents damage on the sliding surface.

Since the present invention has the foregoing constitution and acts as mentioned above, the seizing resistance of various mechanical parts such as rolling bearing and cam follower can be improved, making it possible to enhance the durability and reliability of these various mechanical parts and machines having these various mechanical parts incorporated therein. Further, the present invention can lessen the surface roughness and improve the out-of-roundness, making it possible to improve the rotary properties of various apparatus having rolling sliding parts incorporated therein. Moreover, the present invention can give an improved dimensional accuracy that improves mountability with respect to other members.

What is claimed is:

1. A process for the production of a rolling sliding member comprising:

forming a formed film made of a manganese phosphate file on at least an area of said rolling sliding member which comes into contact with a surface of its mating member with relative displacement during use, and smoothing said formed film by lessening the surface roughness thereof.

2. The process according to claim 1, wherein said smoothing step is one of rolling, shot peening, honing, lap finishing, barrel finishing and grinding.

3. A rolling sliding member made of an iron-based metal having a formed film made of a manganese phosphate film and being disposed at least on an area of said rolling sliding member which comes into contact with a surface of its mating member with relative displacement during use, wherein said formed film is subjected to smoothing for lessening the surface roughness thereof.

4. The rolling sliding member according to claim 3, wherein said rolling sliding member comprises at least one of an inner ring, an outer ring, and a rolling element rotatable between said inner and outer rings.

* * * * *